United States Patent
Lau

(10) Patent No.: US 10,845,000 B2
(45) Date of Patent: Nov. 24, 2020

(54) DISPLAY SUPPORT SYSTEM

(71) Applicant: Colebrook Bosson Saunders (Products) Limited, London (GB)

(72) Inventor: Alex Lau, London (GB)

(73) Assignee: COLEBROOK BOSSON SAUNDERS (PRODUCTS) LIMITED, London (GB)

(*) Notice: Subject to any disclaimer, the term of this patent is extended or adjusted under 35 U.S.C. 154(b) by 222 days.

(21) Appl. No.: 15/331,090

(22) Filed: Oct. 21, 2016

(65) Prior Publication Data

US 2018/0112820 A1 Apr. 26, 2018

(51) Int. Cl.
| | |
|---|---|
| F16M 13/02 | (2006.01) |
| F16M 11/20 | (2006.01) |
| F16M 11/24 | (2006.01) |
| F16M 11/06 | (2006.01) |
| F16M 11/14 | (2006.01) |

(52) U.S. Cl.
CPC ...... *F16M 13/022* (2013.01); *F16M 11/2092* (2013.01); *F16M 11/24* (2013.01); *F16M 13/02* (2013.01); *F16M 11/06* (2013.01); *F16M 2200/04* (2013.01); *F16M 2200/044* (2013.01); *F16M 2200/063* (2013.01); *F16M 2200/068* (2013.01)

(58) Field of Classification Search
CPC ............. F16M 2200/044; F16M 11/10; F16M 2200/063; F16M 11/24; F16M 11/2092; F16M 2200/041; F16M 13/022; F16M 2200/04; F16M 11/04; F16M 2200/068; F16F 1/027; F16F 1/042; F16F 15/28; F16F 1/021; F16F 1/12; G02B 7/001; A61B 6/447; F21V 21/26

USPC .... 248/280.11, 123.11, 292.11, 917, 292.13, 248/162.1

See application file for complete search history.

(56) References Cited

U.S. PATENT DOCUMENTS

| | | | |
|---|---|---|---|
| 899,769 A | 9/1908 | Tideman | |
| 1,806,724 A | 5/1931 | William | |
| 2,038,045 A * | 4/1936 | Heiser | E04F 10/0618 160/70 |
| 3,820,752 A | 6/1974 | Oram | |
| 4,055,329 A | 10/1977 | Hammond | |

(Continued)

FOREIGN PATENT DOCUMENTS

| | | |
|---|---|---|
| AU | 2003204503 | 1/2004 |
| DE | 9004843 U1 | 7/1990 |

(Continued)

OTHER PUBLICATIONS

International Search Report and Written Opinion for Application No. PCT/GB2017/053174 dated Feb. 19, 2018 (14 pages).

*Primary Examiner* — Hiwot E Tefera
*Assistant Examiner* — Taylor L Morris
(74) *Attorney, Agent, or Firm* — Michael Best & Friedrich LLP

(57) ABSTRACT

A support system for a display device includes a first arm. A second arm is rotatably connected to the first arm about a first axis. A joint is rotatably connected to the second arm about a second axis. A biasing system includes a biasing member having a first end positioned in the first arm and a second end positioned in the second arm. The biasing member provides a force to balance a load applied to the second arm.

20 Claims, 17 Drawing Sheets

(56) References Cited

U.S. PATENT DOCUMENTS

| | | | |
|---|---|---|---|
| 4,234,150 A | 11/1980 | Mee et al. | |
| 4,266,747 A * | 5/1981 | Souder, Jr. | F16M 11/14 248/123.11 |
| 4,393,541 A * | 7/1983 | Hujsak | B25J 17/0241 16/291 |
| 4,483,070 A * | 11/1984 | Junkermann | A01G 3/08 224/185 |
| 4,523,732 A * | 6/1985 | Biber | F16M 11/046 248/123.11 |
| 4,545,555 A | 10/1985 | Koch | |
| 4,589,621 A | 5/1986 | Hunt et al. | |
| 4,685,648 A * | 8/1987 | Dobner | F16F 15/28 248/123.11 |
| 4,736,490 A * | 4/1988 | Wesselski | B64G 1/641 16/292 |
| 4,768,762 A * | 9/1988 | Lund | E05F 1/1075 108/136 |
| 4,770,384 A * | 9/1988 | Kuwazima | F16M 11/10 248/280.11 |
| 4,834,329 A | 5/1989 | Delapp | |
| 4,943,020 A * | 7/1990 | Beaucoup | B23Q 1/48 248/123.11 |
| 5,016,153 A * | 5/1991 | Gismondi | F16M 11/10 362/287 |
| 5,170,975 A | 12/1992 | Chadwick | |
| 5,241,716 A | 9/1993 | Kohus | |
| 5,339,233 A * | 8/1994 | Yang | F16M 11/10 362/345 |
| 5,435,515 A | 7/1995 | Digiulio et al. | |
| 5,538,214 A | 7/1996 | Sinila | |
| 5,609,316 A * | 3/1997 | Tigliev | A61B 90/25 248/123.11 |
| 5,746,404 A * | 5/1998 | Merko | F16M 11/08 248/123.11 |
| 5,842,312 A * | 12/1998 | Krumme | B63B 21/502 52/167.1 |
| 6,070,839 A * | 6/2000 | Brenner | F16M 11/10 248/123.11 |
| 6,113,046 A * | 9/2000 | Wang | A47B 21/0314 248/278.1 |
| 6,168,341 B1 * | 1/2001 | Chene | E05D 11/0081 16/228 |
| 6,227,508 B1 | 5/2001 | Panzarella et al. | |
| 6,354,552 B1 | 3/2002 | Chiu | |
| 6,378,829 B1 | 4/2002 | Stater et al. | |
| 6,467,936 B1 * | 10/2002 | Golemba | F21S 6/003 362/275 |
| 6,523,796 B2 * | 2/2003 | Abramowsky | F16M 11/10 248/123.11 |
| 6,592,090 B1 * | 7/2003 | Li | F16M 11/2092 248/284.1 |
| 6,663,266 B2 * | 12/2003 | Huang | F16M 11/2064 362/33 |
| 6,672,553 B1 * | 1/2004 | Lin | F16M 11/08 248/276.1 |
| 6,758,585 B1 * | 7/2004 | Chan | F16M 11/10 248/164 |
| 6,769,657 B1 * | 8/2004 | Huang | F16M 11/10 248/278.1 |
| 6,857,610 B1 * | 2/2005 | Conner | F16M 11/14 248/284.1 |
| 6,889,404 B2 * | 5/2005 | Lu | E05D 3/14 16/287 |
| 6,896,230 B2 * | 5/2005 | Cvek | F16M 11/10 248/276.1 |
| 6,899,308 B2 | 5/2005 | Chow et al. | |
| 6,912,121 B2 | 6/2005 | Karidis et al. | |
| 6,997,422 B2 * | 2/2006 | Sweere | F16M 11/105 248/123.11 |
| 7,104,512 B2 | 9/2006 | Wolf et al. | |
| 7,290,744 B2 * | 11/2007 | Baldasari | A63B 63/083 248/123.11 |
| 7,325,777 B2 | 2/2008 | Thiessen | |
| 7,338,019 B2 | 3/2008 | Liu et al. | |
| 7,367,376 B2 * | 5/2008 | Llagostera Forns | E04F 10/0611 160/66 |
| 7,396,233 B2 | 7/2008 | Lin | |
| 7,398,950 B2 | 7/2008 | Hung | |
| 7,416,163 B2 | 8/2008 | Gaida et al. | |
| 7,441,758 B2 | 10/2008 | Coffield et al. | |
| 7,451,797 B2 * | 11/2008 | Llagostera Forns | E04F 10/0611 160/70 |
| 7,458,546 B2 | 12/2008 | Jang | |
| 7,478,786 B2 | 1/2009 | Copeland | |
| 7,513,474 B2 | 4/2009 | Anderson et al. | |
| 7,571,883 B2 | 8/2009 | Van Groesen et al. | |
| 7,618,016 B2 * | 11/2009 | Brown | F16F 1/12 224/185 |
| 7,628,361 B2 | 12/2009 | Gan et al. | |
| 7,628,371 B2 | 12/2009 | Gan et al. | |
| 7,637,463 B2 * | 12/2009 | Yen | F16M 11/2014 248/123.11 |
| 7,663,699 B2 | 2/2010 | Sakata et al. | |
| 7,677,509 B2 | 3/2010 | Jang | |
| 7,726,823 B2 | 6/2010 | Rus et al. | |
| 7,748,666 B2 * | 7/2010 | Oddsen, Jr. | F16M 11/10 248/123.11 |
| 7,748,670 B1 | 7/2010 | Veldez | |
| 7,789,354 B2 | 9/2010 | Gan et al. | |
| 7,861,992 B2 | 1/2011 | Huang | |
| 7,864,262 B2 | 1/2011 | Chen et al. | |
| 7,866,618 B2 | 1/2011 | Grabania et al. | |
| 7,891,631 B2 | 2/2011 | Lee et al. | |
| 7,963,488 B2 | 6/2011 | Hawegawa et al. | |
| 7,988,113 B2 | 8/2011 | Yang et al. | |
| 8,181,927 B2 | 5/2012 | Farrow | |
| 8,199,471 B2 | 6/2012 | Bemelmans et al. | |
| 8,205,849 B2 | 6/2012 | Shimizu | |
| 8,220,765 B2 | 7/2012 | Bailey | |
| 8,228,668 B2 | 7/2012 | Asamarai et al. | |
| 8,267,360 B2 | 9/2012 | Su | |
| 8,272,617 B2 | 9/2012 | Huang | |
| 8,276,869 B2 | 10/2012 | Huang | |
| 8,342,467 B2 * | 1/2013 | Stachowski | A61B 8/00 248/280.11 |
| 8,465,007 B2 | 6/2013 | Coffield et al. | |
| 8,570,723 B2 | 10/2013 | Myerchin | |
| 8,576,553 B2 * | 11/2013 | Myerchin | F16M 11/046 248/123.2 |
| 8,584,996 B2 | 11/2013 | Chung | |
| 8,651,437 B2 | 2/2014 | Liu | |
| 8,690,112 B2 | 4/2014 | Nagao | |
| 8,720,838 B2 * | 5/2014 | Bowman | F16M 11/18 248/280.11 |
| 8,794,579 B2 | 8/2014 | Sturman et al. | |
| 8,801,319 B2 * | 8/2014 | Brown | F16M 11/04 403/62 |
| 8,864,092 B2 * | 10/2014 | Newville | F16M 11/08 248/123.11 |
| 8,931,748 B2 * | 1/2015 | Bowman | F16M 11/10 248/280.11 |
| 8,939,438 B2 * | 1/2015 | Kempf | B29C 45/44 267/148 |
| 8,944,396 B2 | 2/2015 | Mau et al. | |
| 9,074,721 B2 | 7/2015 | Lau et al. | |
| 9,429,204 B2 * | 8/2016 | Stefan | A61B 1/00149 |
| 10,024,484 B2 * | 7/2018 | Brown | F16M 11/24 |
| 2004/0206863 A1 * | 10/2004 | Tillschneider | F16F 1/22 248/177.1 |
| 2004/0245419 A1 * | 12/2004 | Sweere | F16M 11/105 248/276.1 |
| 2005/0011045 A1 | 1/2005 | Lu et al. | |
| 2006/0070210 A1 * | 4/2006 | Amdahl | F16M 11/10 16/288 |
| 2006/0091274 A1 * | 5/2006 | Asamarai | F16M 11/10 248/292.11 |

(56) References Cited

U.S. PATENT DOCUMENTS

| | | | |
|---|---|---|---|
| 2006/0231710 A1* | 10/2006 | Huang | F16M 11/2064 248/291.1 |
| 2007/0001076 A1 | 1/2007 | Asamarai et al. | |
| 2007/0102596 A1 | 5/2007 | Sung | |
| 2007/0145204 A1* | 6/2007 | Miyasaki | F16M 11/2021 248/162.1 |
| 2007/0146987 A1* | 6/2007 | Sakata | F16M 11/10 361/679.01 |
| 2007/0187562 A1 | 8/2007 | Gaida et al. | |
| 2007/0205341 A1 | 9/2007 | Chih et al. | |
| 2008/0191400 A1* | 8/2008 | Liu | F16F 1/042 267/195 |
| 2008/0237413 A1* | 10/2008 | Hammer | F16M 11/105 248/125.1 |
| 2009/0050760 A1 | 2/2009 | Duff | |
| 2009/0084913 A1 | 4/2009 | Grabania et al. | |
| 2009/0159768 A1 | 6/2009 | Oh | |
| 2011/0017007 A1* | 1/2011 | Lin | B25J 15/0491 74/490.01 |
| 2011/0169205 A1* | 7/2011 | Kempf | B29C 45/44 267/180 |
| 2011/0260017 A1* | 10/2011 | Monsalve | F16M 11/2014 248/201 |
| 2011/0289728 A1 | 12/2011 | Wang et al. | |
| 2012/0153536 A1 | 6/2012 | Coffield et al. | |
| 2012/0235000 A1 | 9/2012 | Borloz et al. | |
| 2013/0157501 A1* | 6/2013 | Ishii | B25J 9/1065 439/527 |
| 2013/0327911 A1 | 12/2013 | Russell | |
| 2013/0343806 A1* | 12/2013 | Ng | F16M 11/2021 403/120 |
| 2014/0098942 A1* | 4/2014 | Omura | A61B 6/4405 378/197 |
| 2014/0366674 A1* | 12/2014 | Swartz | B25J 18/00 74/490.05 |
| 2017/0340408 A1* | 11/2017 | Oginski | A61G 12/002 |

FOREIGN PATENT DOCUMENTS

| | | |
|---|---|---|
| EM | 001064125 | 9/2009 |
| EM | 001219471 | 9/2010 |
| FR | 2922624 A1 | 4/2009 |
| WO | 2005004673 | 1/2005 |

* cited by examiner

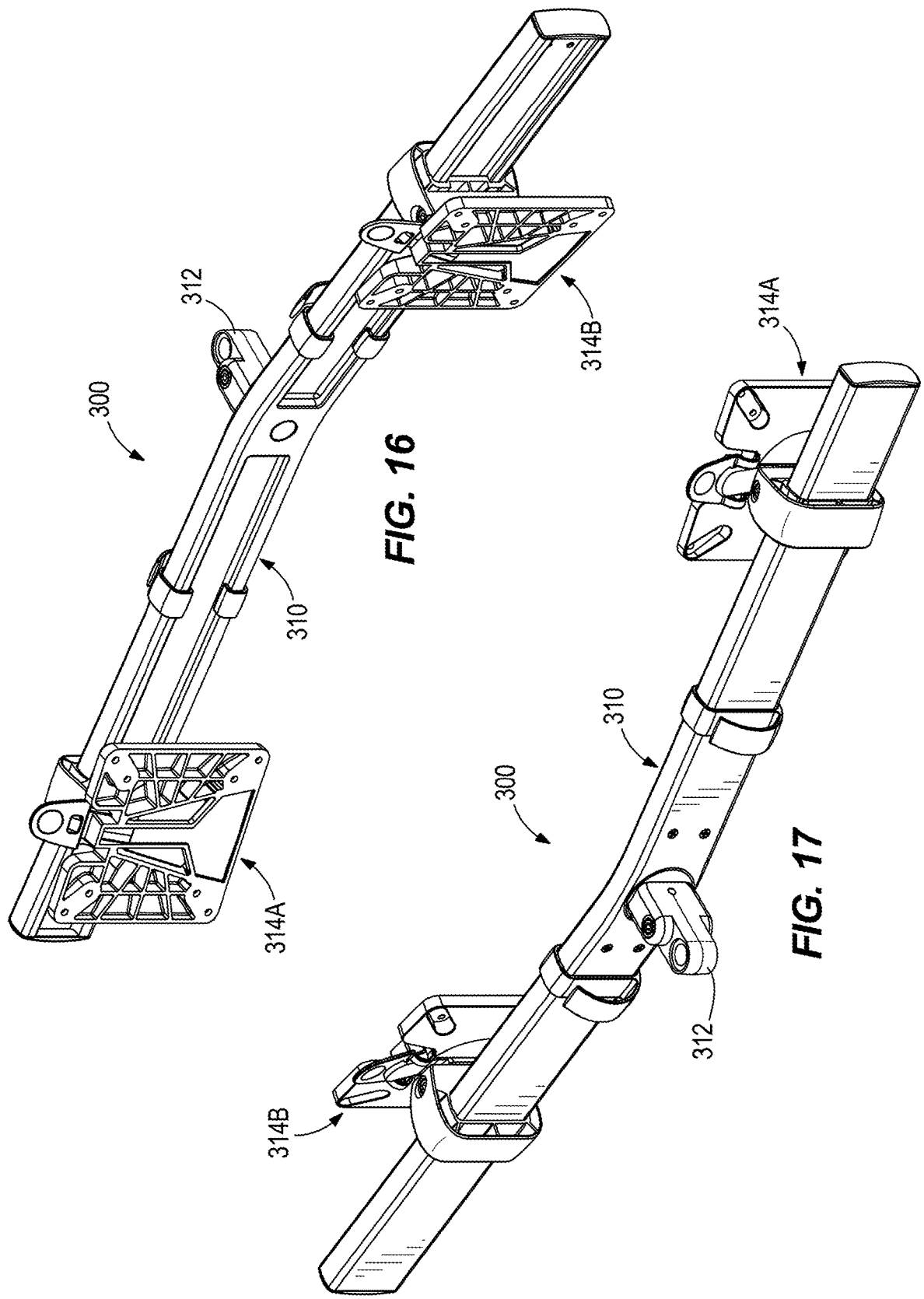

DISPLAY SUPPORT SYSTEM

FIELD

Various exemplary embodiments relate to a support system used to moveably support electronic displays such as monitors or TVs.

BACKGROUND

Modern screen-based display devices are typically flat-screen monitors such as liquid crystal display (LCD) or plasma screen displays. Such devices can be mounted on elevated support devices such as a support arm which can then be secured to a surface such that the flat-screen monitor is held above or in front of the surface.

SUMMARY

According to an exemplary embodiment, a support system for a display device includes a first arm. A second arm is rotatably connected to the first arm about a first axis. A joint is rotatably connected to the second arm about a second axis. A biasing system includes a biasing member having a first end positioned in the first arm and a second end positioned in the second arm. The biasing member provides a force to balance a load applied to the second arm.

According to another exemplary embodiment, a support system for a display device includes a support structure having a first arm and a second arm rotatably connected to the first arm about a first axis. A biasing system includes a biasing member extending between the first arm and the second arm. The biasing member provides a force to balance a load applied to the support structure. An adjustment mechanism connected to the biasing system includes a moveable fulcrum for adjusting the force provided by the biasing member.

Another exemplary embodiment includes a method of adjusting a support system for display device. A display device is attached to a support system. The support system includes a first arm, a second arm rotatably connected to the first arm about a first axis, a biasing member extending between the first arm and the second arm and providing a force. An adjustment mechanism connected to the biasing system is adjusted to move the position of a fulcrum to adjust the force provided by the biasing member.

BRIEF DESCRIPTION OF THE DRAWINGS

The aspects and features of various exemplary embodiments will be more apparent from the description of those exemplary embodiments taken with reference to the accompanying drawings, in which:

FIG. 16 is a front perspective view of a dual mount;

FIG. 17 is a rear perspective view of FIG. 16;

DETAILED DESCRIPTION OF EXEMPLARY EMBODIMENTS

Figure 1:
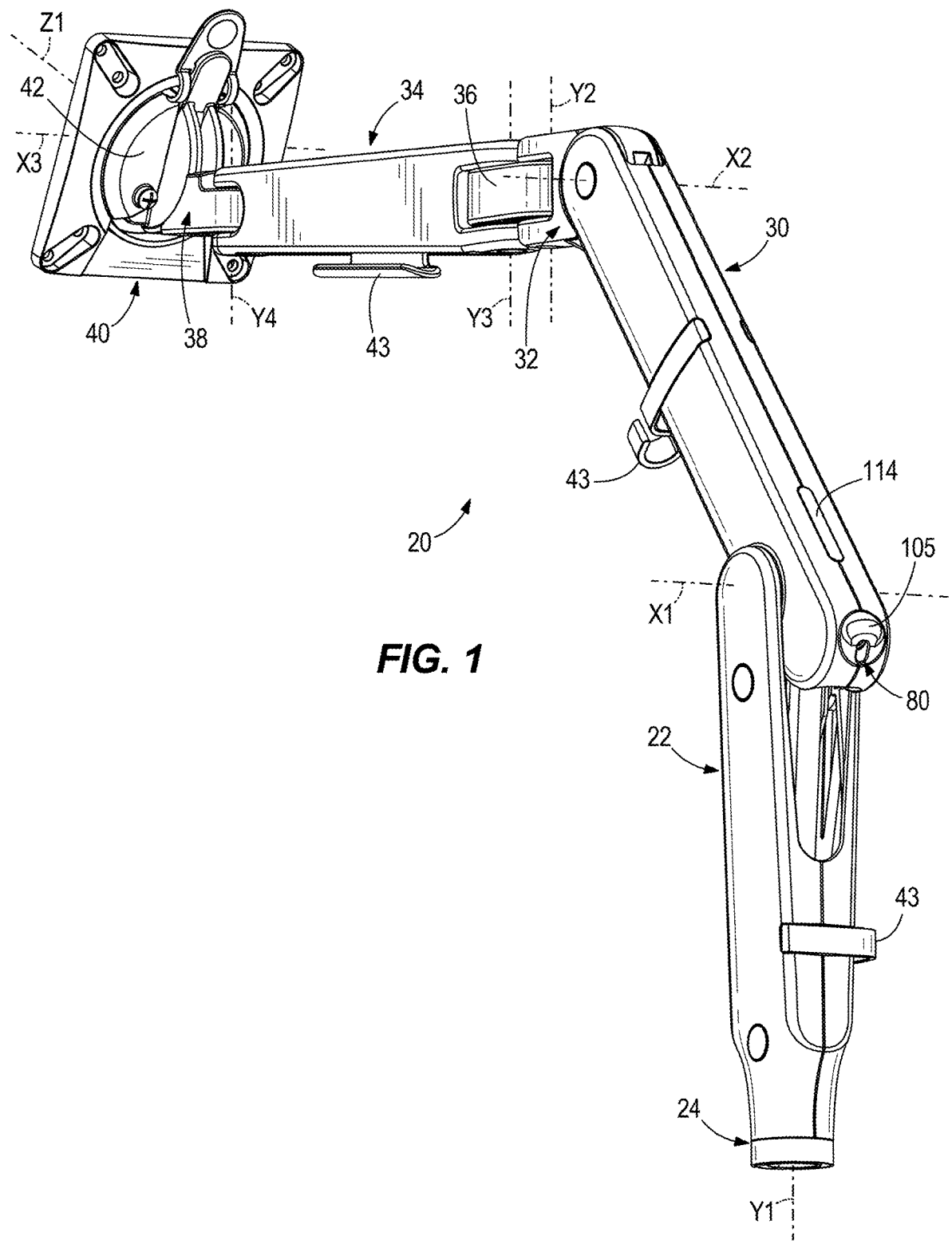
FIG. 1 is a rear perspective view of an exemplary support system.
Figure 2:
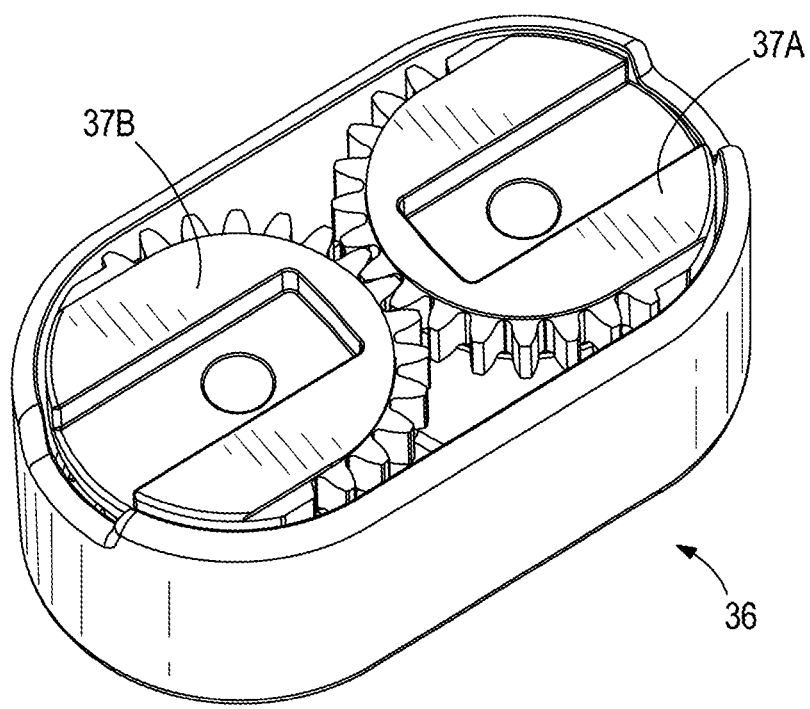
FIG. 2 is a bottom perspective view of an exemplary link member and gear assembly.
Figure 3:
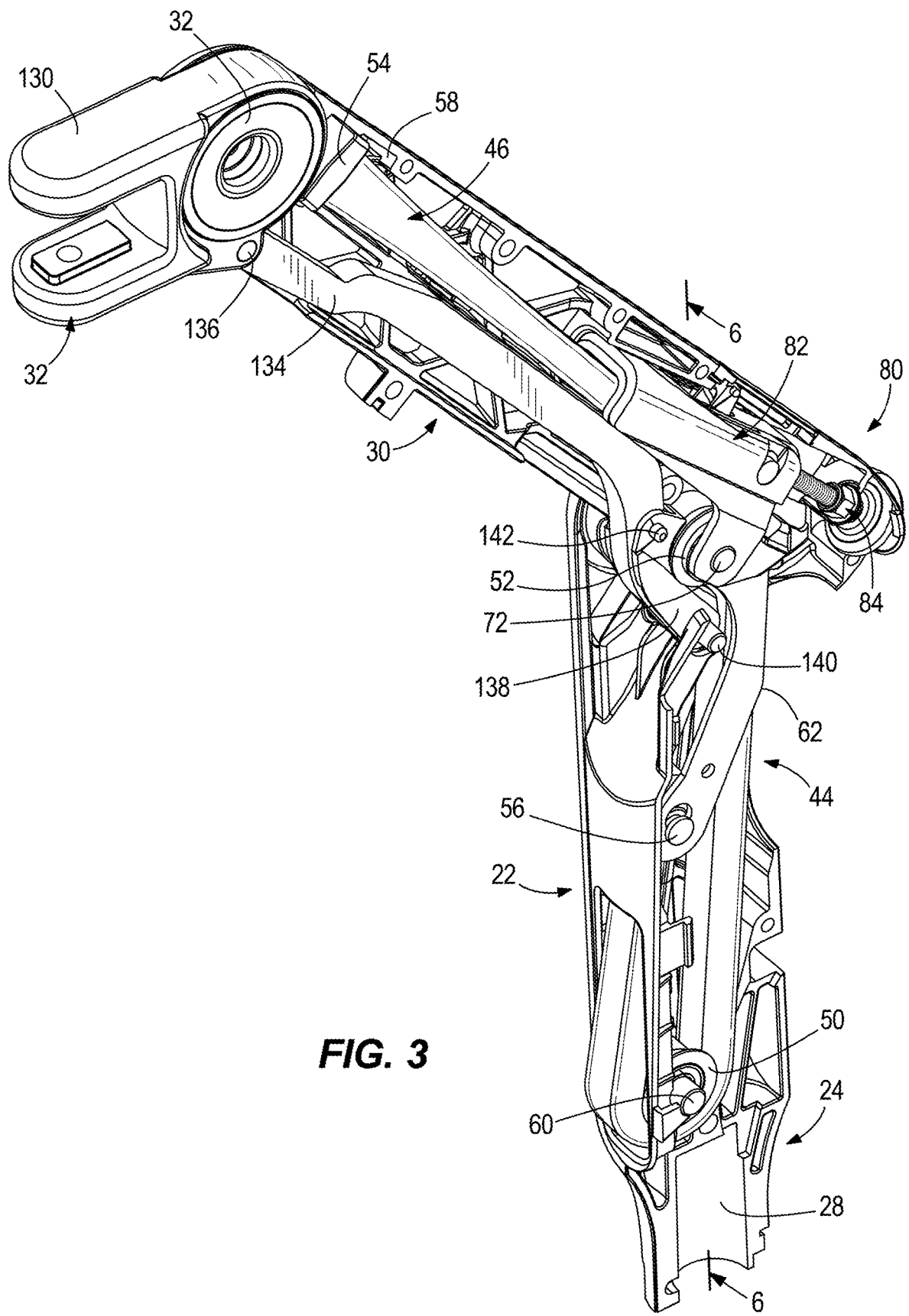
FIG. 3 is a front perspective view of the first arm, second, arm, and motion joint of FIG. 1, with half of the first and second arm housing removed, and the second arm in a raised position.
Figure 4:
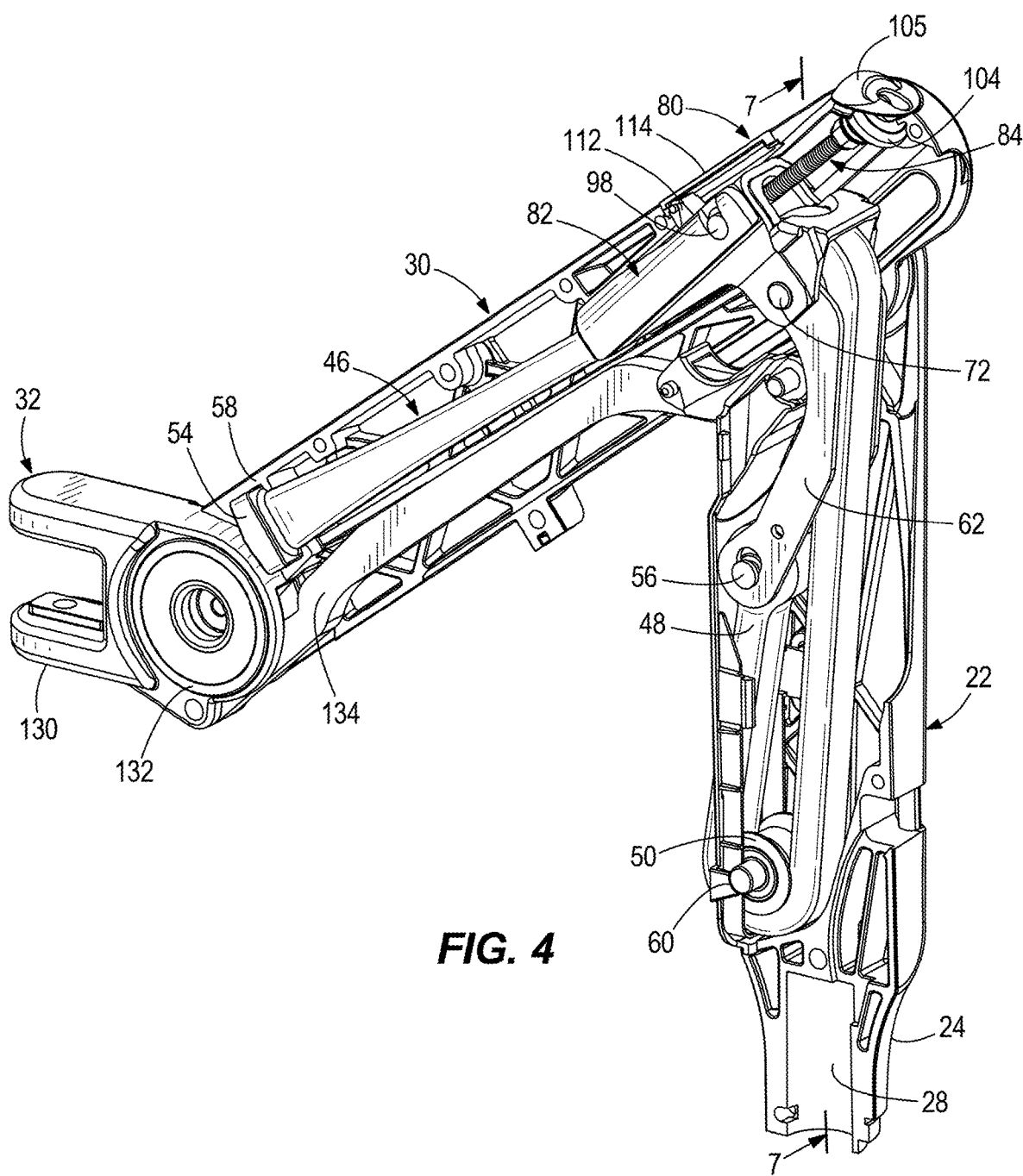
FIG. 4 is a side perspective view of FIG. 3, with the second arm in a lowered position.

FIG. 1 shows an exemplary embodiment of a support system 20 for a display that includes a first arm 22 having a mounting portion 24 at a proximal end for rotatably connecting the support system to a surface (not shown). As best shown in FIG. 2, the mounting portion 24 can include a cylindrical cavity 28 for slidably receiving a mounting member that can be connected to various surfaces or supports, such as desk, tables, walls, etc. as would be understood by one of ordinary skill in the art. A proximal portion of a second arm 30 is rotatably connected to a distal portion of the first arm 22. A motion joint 32 is rotatably connected to the distal portion of the second arm 30. A proximal portion of a third arm 34 is rotatably connected to the motion joint 32 by a link member 36. A mounting head 38 is rotatably connected to a distal portion of the third arm 34 and connected to display mount 40, for example a VESA type display mount. Each of the first, second, and third arms 22, 30, 34 can include a one piece or two piece housing where the first and second pieces are connected to one another. Other housing pieces can be connected as needed. One or more clips 43 can be positioned on the one or more of the arms to organize and retain cables running to the display. The first arm 22, second arm 30, motion joint 32, third arm 34 and link member 36 make up an exemplary embodiment of a support structure, although other variations of support structures may also be used.

As best shown in FIG. 1, the first arm 22 can rotate relative to the support or surface about a first vertical axis Y1. The second arm 30 can rotate relative to the first arm 22 about a first horizontal axis X1. The motion joint 32 can rotate relative to the second arm 30 about a second horizontal axis X2. The link member 36 can rotate relative to the motion joint 32 about a second vertical axis Y2 and the third arm 34 can rotate relative to the link member 36 about a third vertical axis Y3. The mounting head 38 can rotate relative to the third arm 34 about a fourth vertical axis Y4 and can include a pivoting portion that rotates about a third horizontal axis X3. In an exemplary embodiment the third horizontal axis X3 is a virtual axis spaced from the pivoting portion to extend either through the display mount 40 or a portion of a display connected thereto. The display mount 40 can include a turntable portion 42 that is capable of rotating about an applicate axis Z1.

As best shown in FIG. 2, the link member 36 can contain a gear assembly that limits rotation of the third arm 34 relative to the second arm 30. For example, a first gear 37A having a first set of teeth and a second gear 37B having a second set of teeth can be rotatably connected inside of the link member 36. The first teeth and second teeth mesh with one another, and the end of the teeth form a stop that prevents the third arm 34 from contacting the second arm 30 during rotation. The gear assembly also helps to limit or prevent unwanted rotation of the third arm 24 relative to the second arm 30.

FIGS. 3-10 show an exemplary embodiment of internal components of the support system 20 which include a biasing system 44 that provides a force to offset the torque created by the weight of a load attached to the support system, for example a monitor connected to the display mount 40. The biasing system 44 includes a biasing member 46 that extends from the first arm 22 to the distal portion of the second arm 30. The biasing member 46 extends from a first end portion 48 anchored in the first arm 22, around a first pulley 50 positioned in the first arm 22, around a second pulley 52 positioned in the second arm 30, and to a second end portion 54 anchored in the second arm 30. In an exemplary embodiment, the first end portion 48 includes a loop member that is connected in the first arm 22 by a first pin 56 and the second end portion 54 includes an enlarged head that fits into a chamber 58 formed in the second arm 30.

The first pulley 50 can include a wheel and one or more bearings connected to the first arm 22 by a second pin 60. The first pulley 50 is positioned below the first end portion 48 so that the biasing member 46 includes a portion extending away from the second arm 30 and a portion extending toward the second arm 30. A bracket 62 extends between the first end portion 48 of the biasing member 46 and the second pulley 52. The bracket 62 includes a first side 64 and a second side 66. A first set of openings 68 extends through the bottom of the first and second sides 64, 66 to receive the first pin 56 and a second set of openings 70 extends through the top of the first and second sides 64, 66 to receive a third pin 72. The first end portion 48 of the biasing member 46 is positioned between the first and second sides 64, 66 with the opening in the loop member aligned with the first set of openings 68. The second pulley 52 can include a wheel and one or more bearings, and is positioned between the first and second sides 64, 66 and rotatable about the third pin 72.

The support system 20 can also include an adjustment mechanism 80 as best shown in FIGS. 3-6B. The adjustment mechanism 80 is configured to adjust the tension of the biasing member 46 to increase or decrease the amount of counter force provided by the biasing system 44. In an exemplary embodiment the adjustment mechanism 80 includes an adjustment body 82 and a movement mechanism 84. Through adjustment of the movement mechanism 84, the adjustment body 82 can change the position of the second pulley 52, altering the position at which the second pulley 52 acts on the biasing member 46. In essence, the second pulley 52 acts a fulcrum point to balance a load connected to the support system 20, and moving the second pulley 52 adjusts the amount of force needed to move the second arm 30.

The adjustment body 82 includes a first member 86, a second member 88, and a third member 90. The first member 86 has a body including a top wall and a pair of sidewalls in a substantially U-shaped configuration. The first member 90 sidewalls include a first set of aligned openings 92. The second member 88 has a body including a top wall and a pair of sidewalls in a substantially U-shaped configuration. The second member 88 sidewalls include a second set of aligned openings 94. The third member 90 has a body including a concave receiving area 96. When assembled, the first set of openings 92, second set of openings 94, and the concave receiving area 96 align to receive an adjustment pin 98. The adjustment pin 98 has an opening 100 for receiving the movement mechanism 84.

Figure 9:
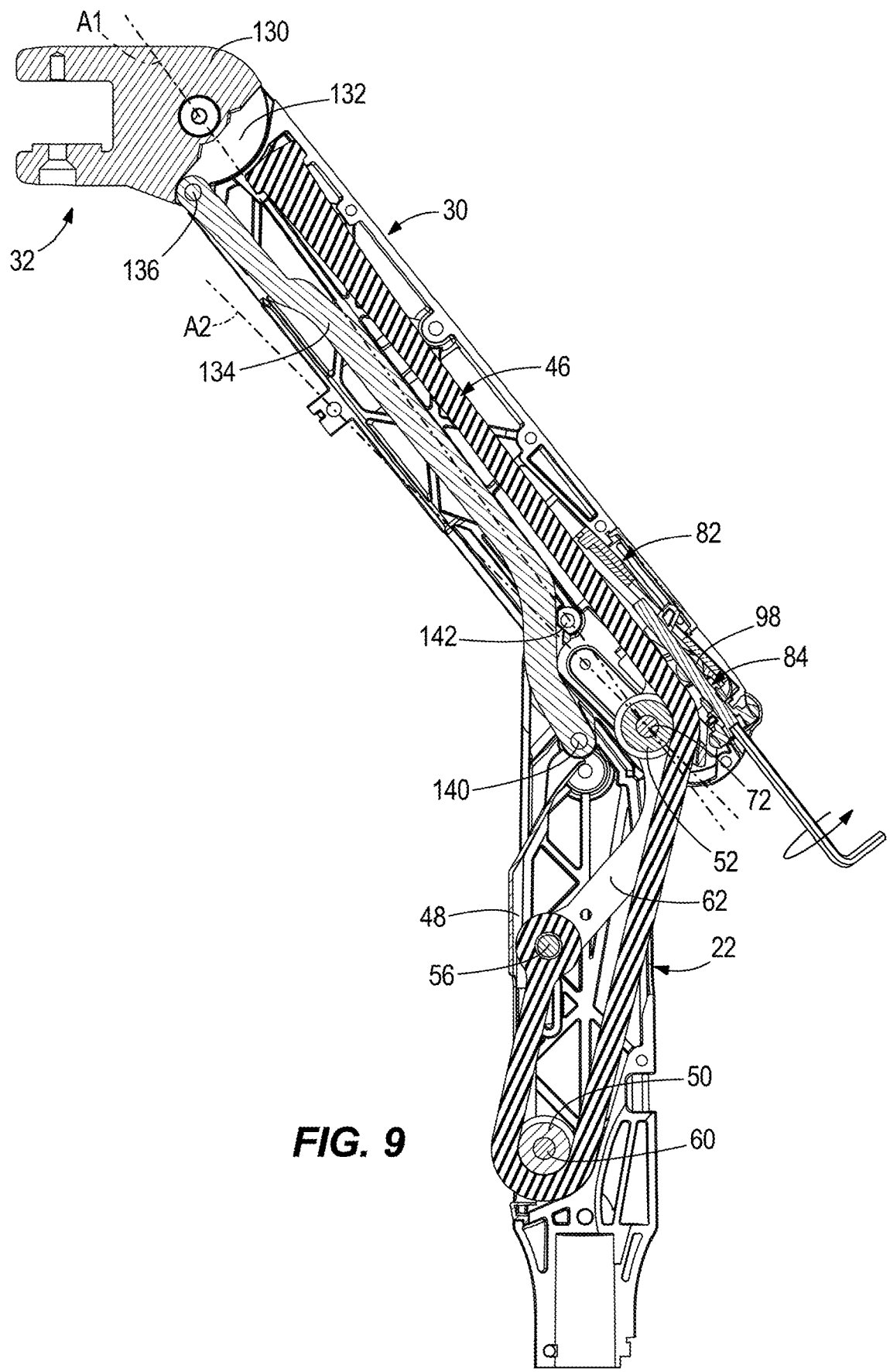
FIG. 9 is a side sectional view of FIG. 3 with the second arm in the raised position and the adjustment mechanism in a rearward position.

In an exemplary embodiment, the movement mechanism 84 includes a threaded portion 102 and a head 104 that is accessible through the second arm 30. The threaded portion 102 engages the opening 100 in the adjustment pin 98 and rotation of the head 104 causes movement of the adjustment pin 98, which causes movement of the first, second, and third members 86, 88, 90. The head 104 can include a thumbwheel and a socket that can be configured to interface with different tools, including a hex wrench as shown in FIG. 9. The thumbwheel allows a user to change the position of the adjustment body 82 without a tool. Certain embodiments can include just the thumbwheel or just the socket. A cover 105 can optionally be connected to the second arm 30 to block the thumbwheel, so that only a tool can be used to alter the position of the adjustment body 82. The cover 105 can be connected to the arm, for example through a snap fit connection that is designed either to be releasable or to be semi-permanent, requiring a component of the cover 105 to be broken or fractured to be removed.

Figure 5:
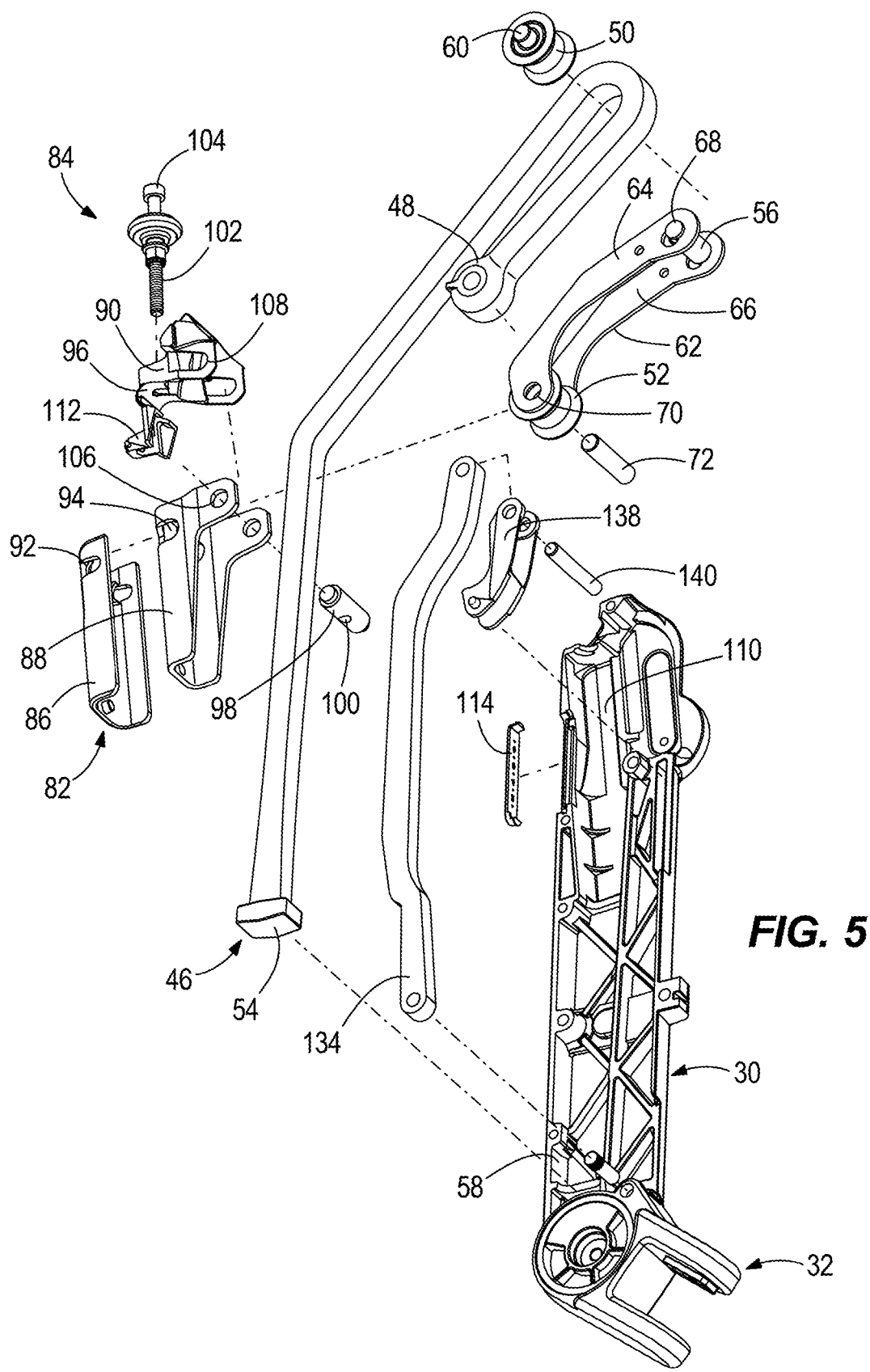
FIG. 5 is an exploded view of the second arm, biasing system, and adjustment mechanism FIG. 3.
Figure 6A:
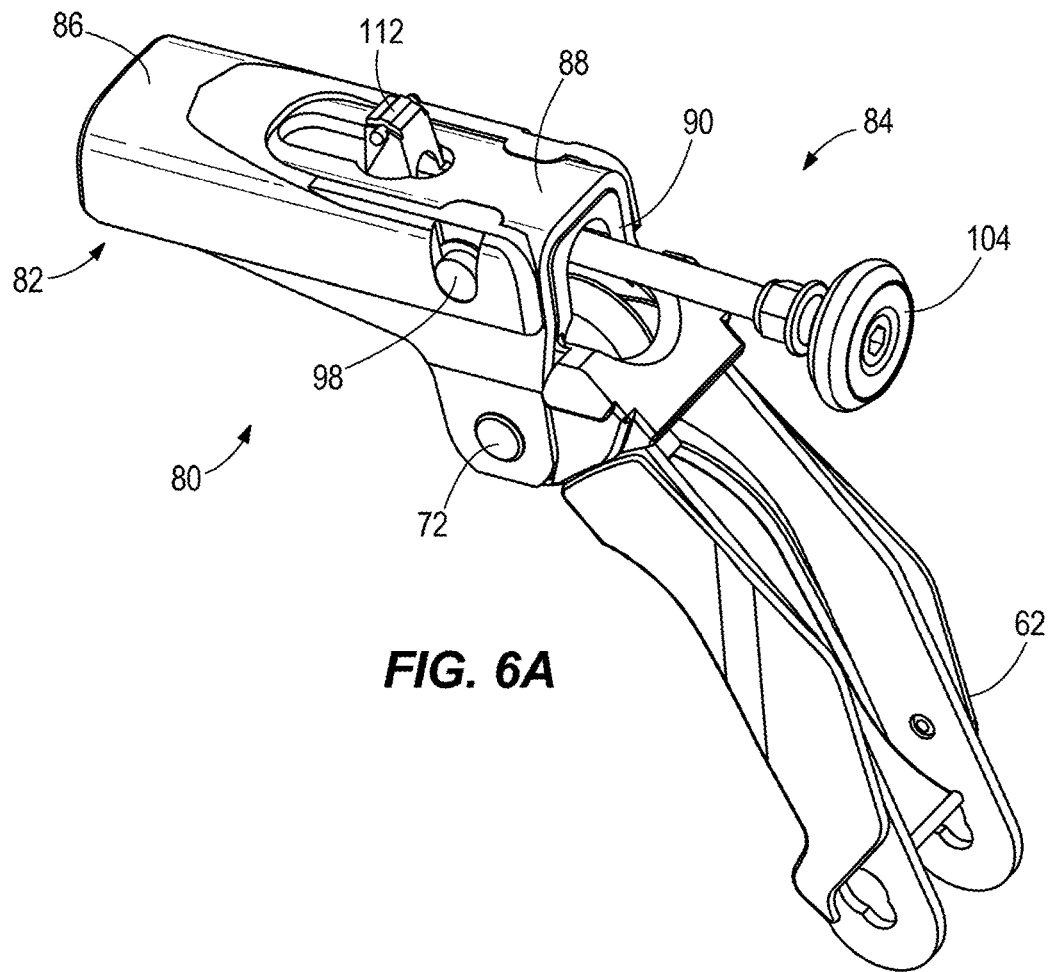
FIG. 6A is a rear perspective view of an exemplary adjustment mechanism.
Figure 6B:
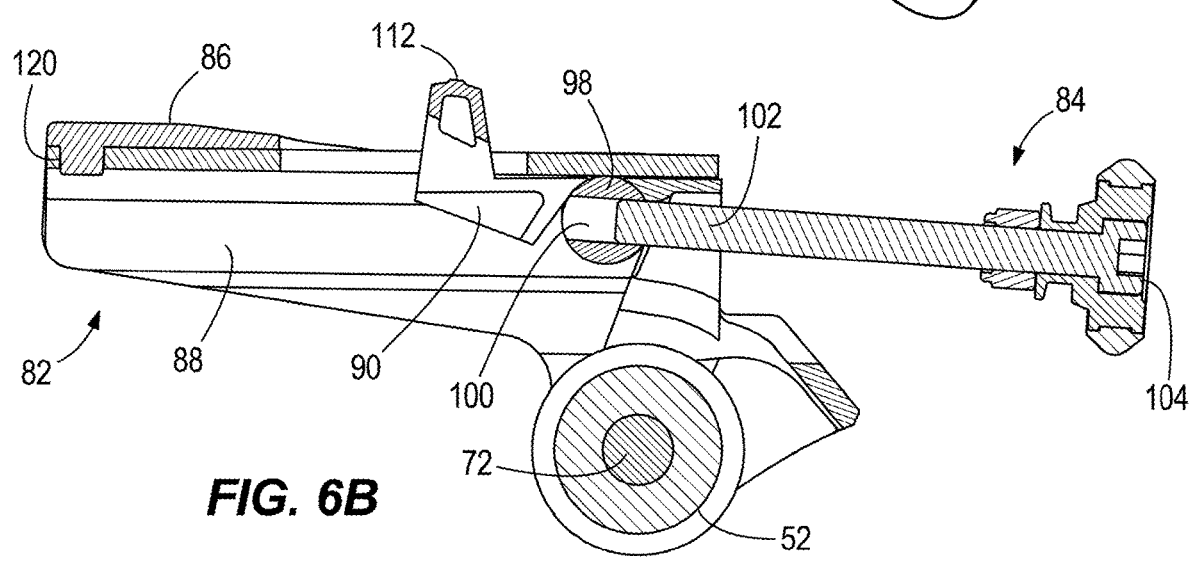
FIG. 6B is a side sectional view of FIG. 6A.

As best shown in FIG. 5, the second member 88 includes a third set of openings 106 positioned below the second set of openings 94 and the third member 90 includes a fourth set of openings 108. When assembled, the third set 106 of openings and the fourth set of openings 108 align with the second set of openings 70 in the bracket 62 to receive the third pin 72, fixing the adjustment body 82 to the second pulley 52 and allowing movement of the adjustment body 82 to move the second pulley 52. The second arm 30 includes a channel or slot 110 along which the second pulley 52 and the components connected thereto move.

Figure 7:
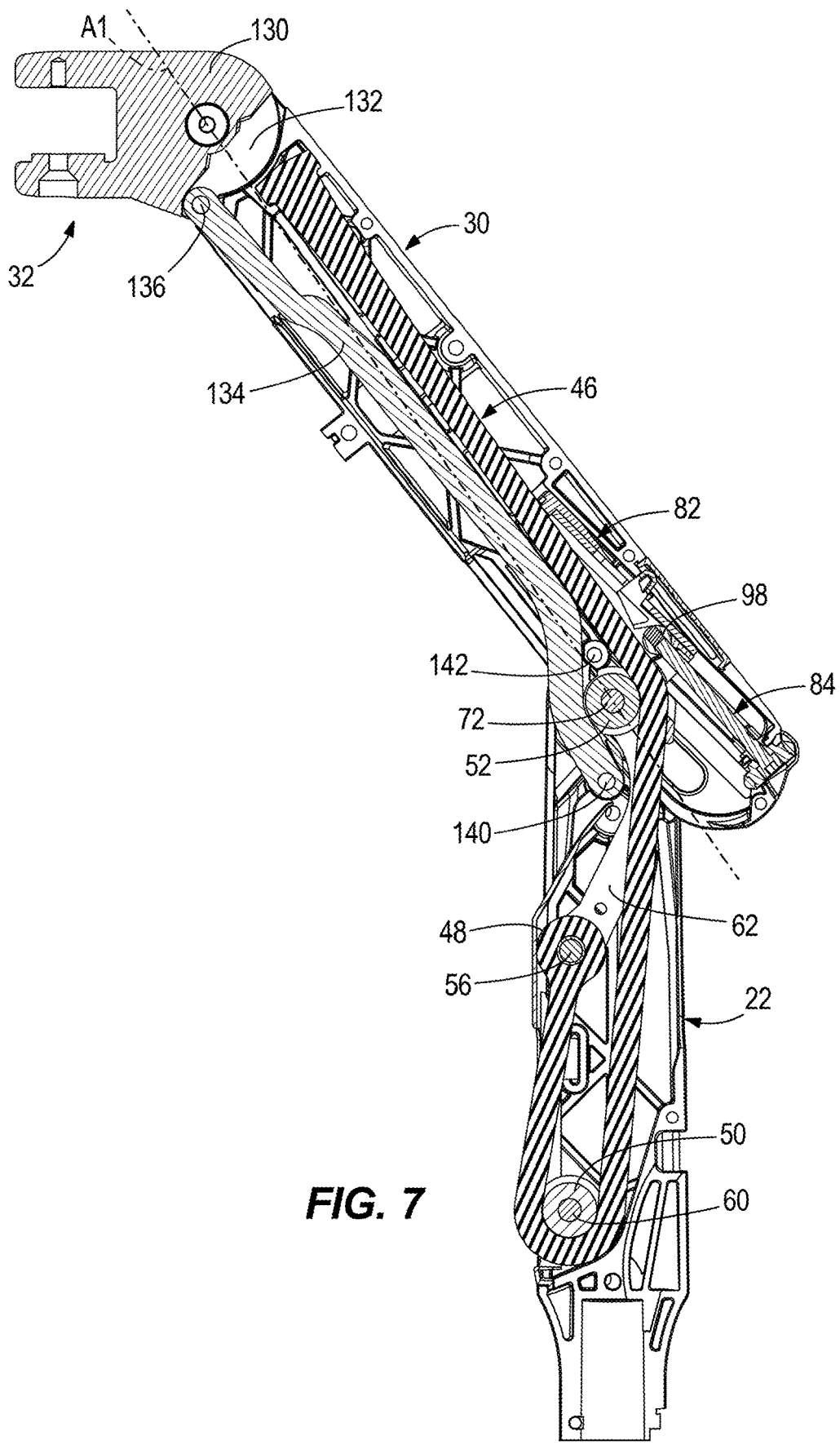
FIG. 7 is a side sectional view of FIG. 3 with the second arm in the raised position and the adjustment mechanism in a forward position.
Figure 8:
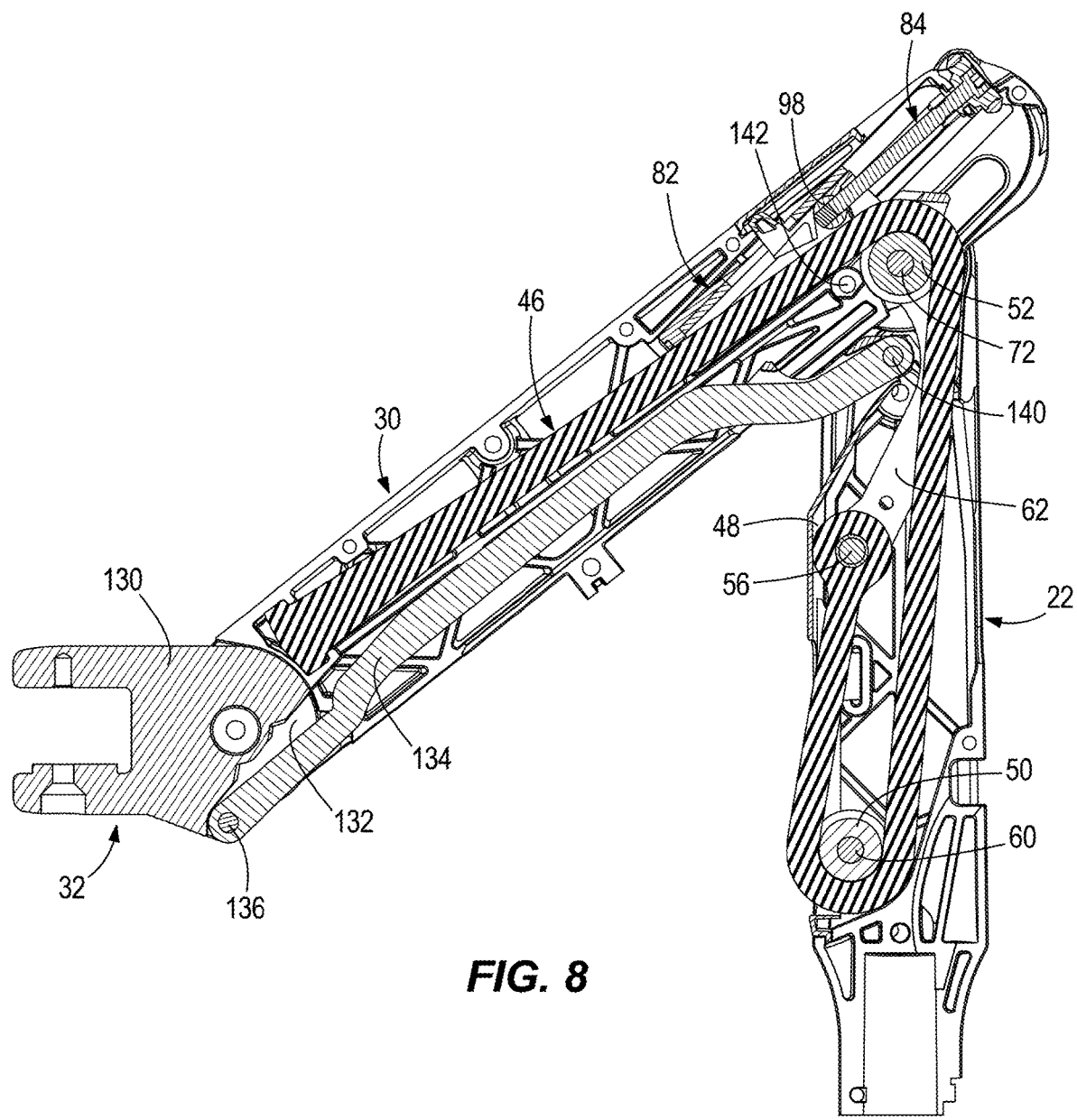
FIG. 8 is a side sectional view of FIG. 3 with the second arm in the lowered position and the adjustment mechanism in a forward position.

FIGS. 7 and 8 show the adjustment body 82, and thus the second pulley 52, positioned all the way forward, or toward the distal end of the second arm 30. In the position of FIG. 7, there is very little or no extension applied to the biasing member 46 so little force is required to move the second arm 30 and only a small load, or in some cases no load, can be supported by the second arm 30 above its lowest position. In an exemplary embodiment, when the adjustment body 82 is all the way forward, the rotation point of the second pulley 52 is substantially perpendicular to the second arm axis A1 that passes through the motion joint 32 rotation axis X2 and the second arm 30 rotation axis X1, and the rotation point of the second pulley can be substantially coaxial with the second arm 30 rotation axis X1. With the second pulley 52 positioned at or near the second arm 30 rotation axis X1 there is little to no supporting force supplied by the biasing member 46.

Figure 10:
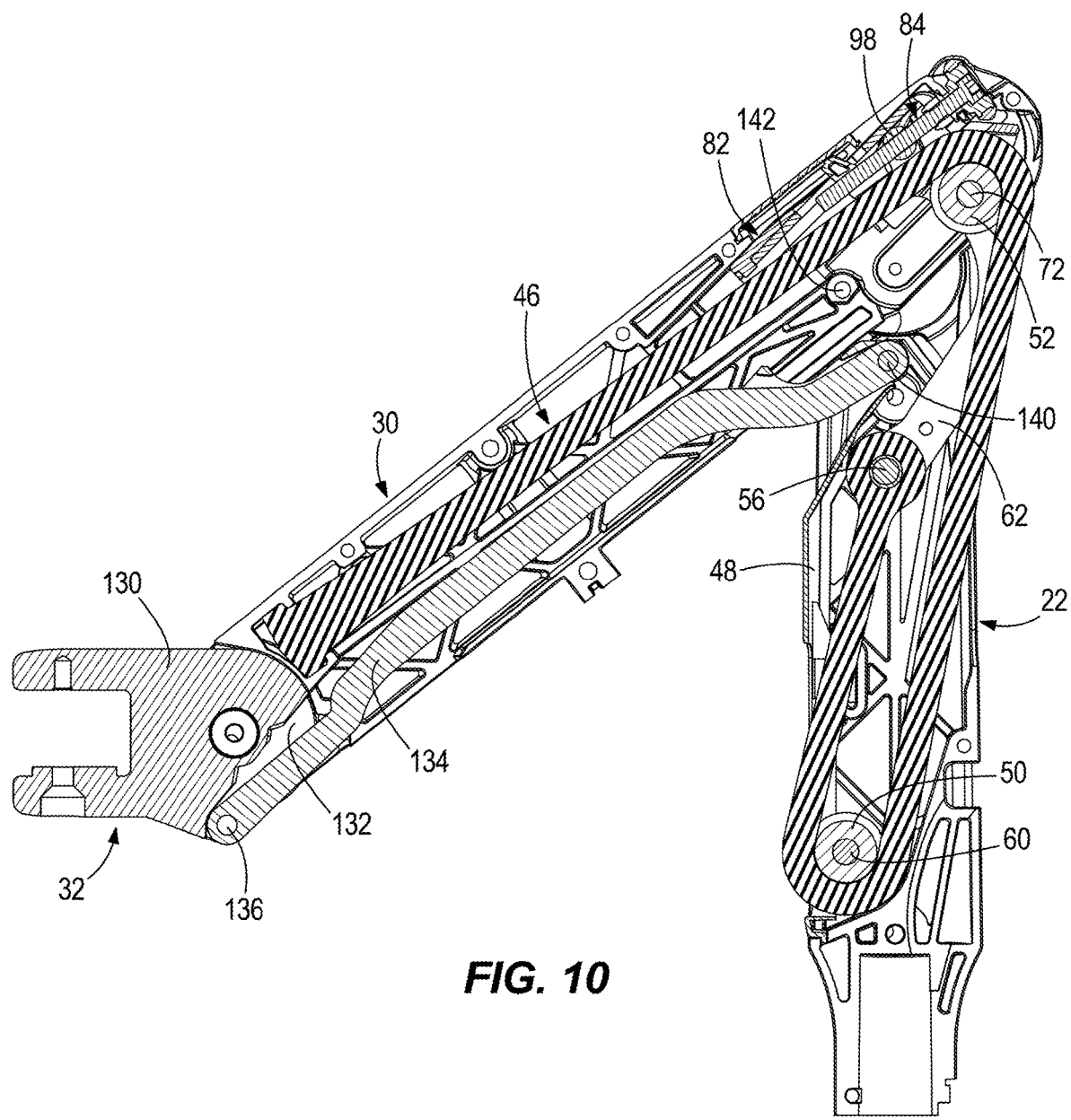
FIG. 10 is a side sectional view of FIG. 3 with the second arm in the lowered position and the adjustment mechanism in a reward position.

FIGS. 9 and 10 show the second pulley 52 positioned all the way back, or toward the proximal end of the second arm 30. In the raised position of FIG. 9, less leverage is required because the load is supported more by the structure of the support arms 22, 30, 34. This results in less resistance to move the adjustment body 82. When the second arm 30 is rotated into a lower position as shown in FIG. 9, the reward position of the second pulley 52 results in greater leverage on the biasing member 46, requiring a greater downward force to overcome the tension and therefore supporting a greater load. As best shown in FIG. 9, the rotation axis of the second pulley 52 is moved away from the second arm 30 rotation axis X1 along an adjustment axis A2 that has an angle offset from the second arm axis A1.

The support system 30 can incorporate an indicator to show the position of the adjustment body 82 to user. In an exemplary embodiment, the third member 90 includes a projection 112 that extends through a first slot in the first member 86 and a second slot in the second member 88. The projection 112 acts as a visual indicator and is visible through a transparent window 114 in the second arm 30. The projection 112 can include coloring or other marking that increases its visibility, and indicates to a user the position of the adjustment body 82. The projection 112 can include side pins that move in slots on the second arm 30 to keep the motion of the projection 112 parallel with the window 114, and allows the at least a portion of the third member 90 to pivot as it is moved along the adjustment axis A2. The first member 86 can include a boss 118 or other projection that mates with a depression or opening in the second member 88 to align the first and second members 86, 88.

In light of the above, various exemplary embodiments can be directed to a method of balancing a load by adjusting the amount of counterforce provided by the biasing member 46. The method can include attaching a display device to the support system 20 and adjusting the biasing member to balance the weight of the display device as discussed above.

FIGS. 7 and 8 also show the second arm 30 being moved from a first, raised position to a second, lowered position. During rotation of the second arm 30, the orientation of the motion joint 32 is held relatively constant by rotation of the motion joint 32 relative to the second arm 30. As best shown in FIGS. 3, 4 and 7-10, the motion joint 32 includes connecting body 130 rotatable about a bearing member 132. A pivot arm 134 has a first end rotatably connected to the motion joint 32, for example about a first pivot arm pin 136, and a second end rotatably connected to a second pivot arm pin 140 that is connected to the first arm 22. The pivot arm 134 can be a rigid, unitary member. A guard 138 can be provided between the pivot arm 134 and the second pulley 52.

As the second arm 30 rotates relative the first arm 22, the pivot arm 134 causes movement of the connecting body 130 about the bearing member 132. For example, when the second arm 30 is moved from the first position shown in FIG. 7 to the second position shown in FIG. 8 the motion joint 32 rotated in the clockwise direction (as viewed in the orientation shown in FIGS. 7 and 8) to keep the orientation of the connecting body 130 substantially constant. This can reduce or prevent tilting of a display connected to the support relative to its original plane.

According to some exemplary embodiments, the biasing member 46 is formed from an elastic material, for example a molded thermoplastic material, for example a thermoplastic copolyester elastomer. After molding, the biasing member 46 can have an initial length that is less than the final length of the biasing member 46 when it is positioned in the first and second arms 22, 30. As used herein, the term final length can mean any length approximately in the range from the minimum final length to the maximum final length as the length of the biasing member 46 is varied by the adjustment mechanism 80. The biasing member 46 can then undergo a treatment, where a force is applied to stretched the biasing member 46 a plurality of times to a stretch length that is greater than the final length and then relaxed. The distance of the stretch length and the amount of times the biasing member 46 is stretched and relaxed can vary depending on the material, the dimensions of the biasing member 46, and the final spring force range required for the biasing member 46. This treatment causes orientation of the elastomer molecules that results in a more consistent, repeatable resultant force from the biasing member and increased life.

Figure 11:
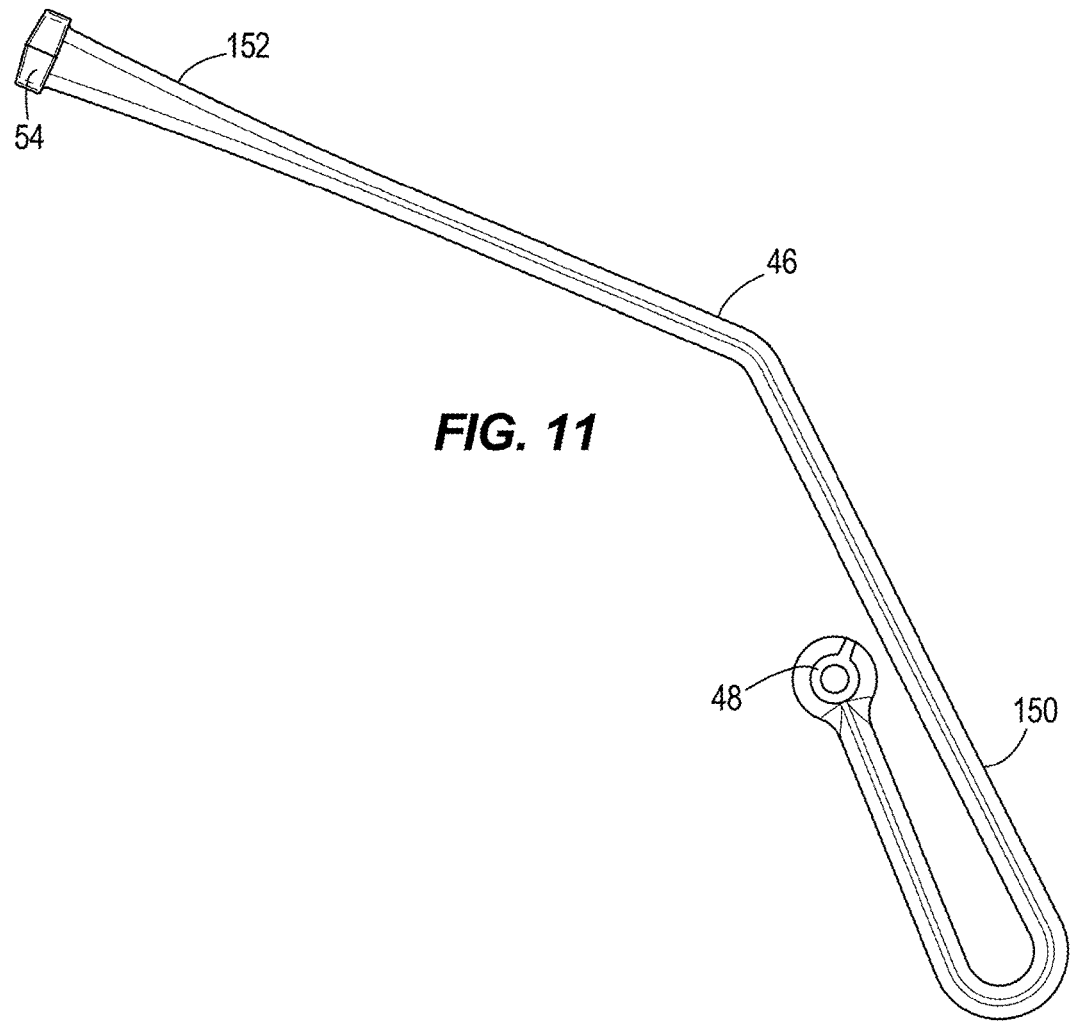
FIG. 11 is a side view of an exemplary biasing member.
Figure 12:
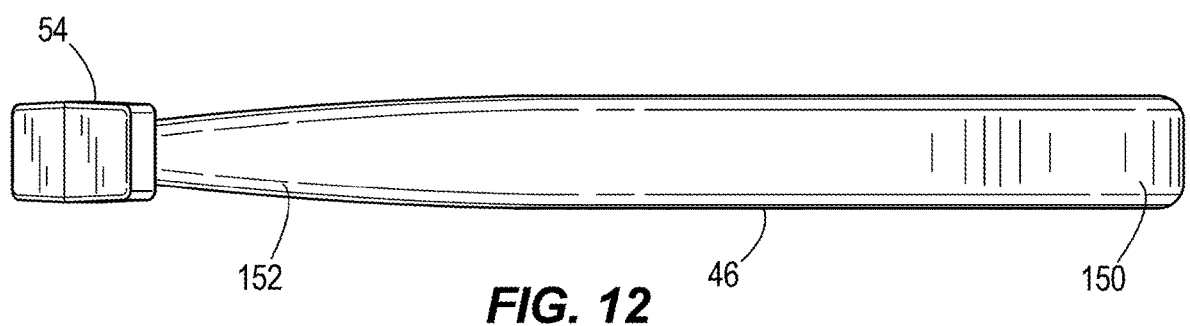
FIG. 12 is a top view of FIG. 10.

Extending between the first end portion 48 and the second end portion 54 the biasing member 46 can include a first section 150 having a first cross-sectional configuration and a second section 152 having a second cross-sectional configuration as best shown in FIGS. 11 and 12. The first section 150 can extend from the first end portion 48 to a region distal of the second pulley 52. The second section 152 can extend from or near the second portion 54 to a region distal of the second pulley 52. Other sections positioned between, before, or after the first and second sections 150, 152 can also be used.

In an exemplary embodiment, the shape and cross sectional configuration of the first section 150 is substantially constant while the shape and the cross sectional configuration of the second section is different from the first section and varies through at least a portion of the second section. In some embodiments, although the first and second sections have different cross section configurations, the cross sectional area of the biasing member 46 between the first end portion 48 and the second end portion 54 can remain substantially constant. For example, the second section 152 can have one dimension that tapers in a first direction while another dimension widens in the first direction.

Figure 13:
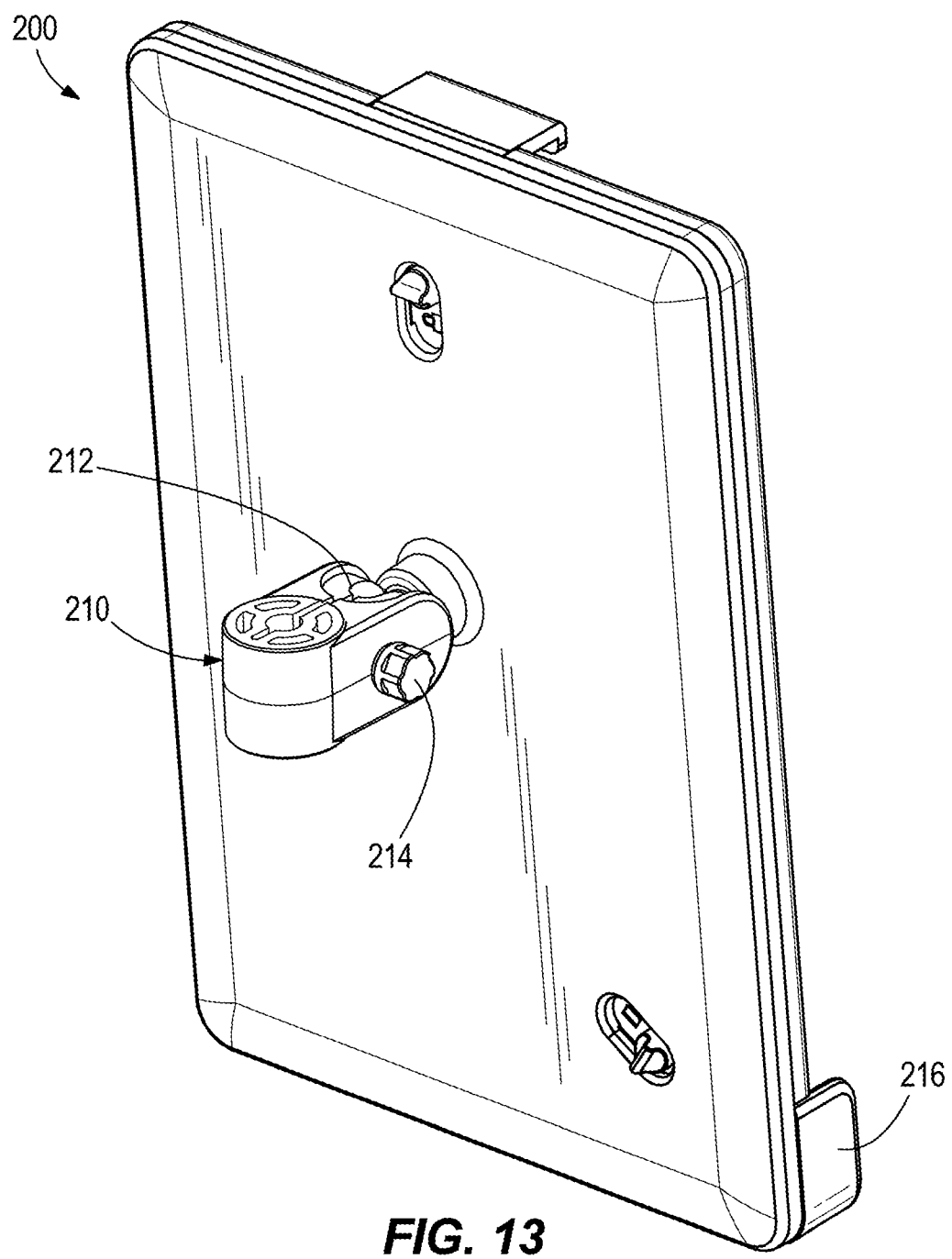
FIG. 13 is a rear perspective view of an exemplary tablet mount.
Figure 14:
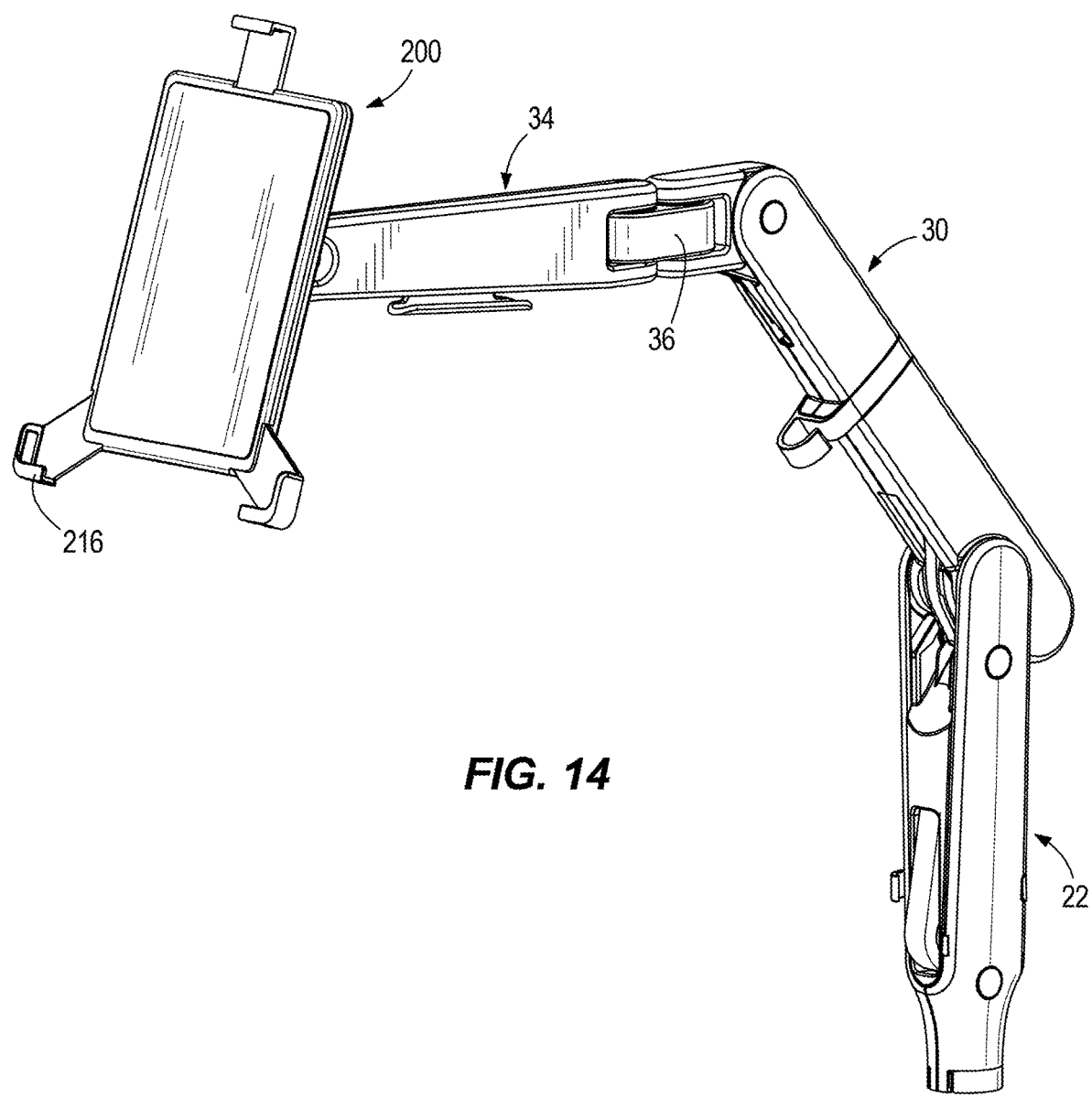
FIG. 14 is a front perspective view of the tablet mount connected to the support system arms.
Figure 15:
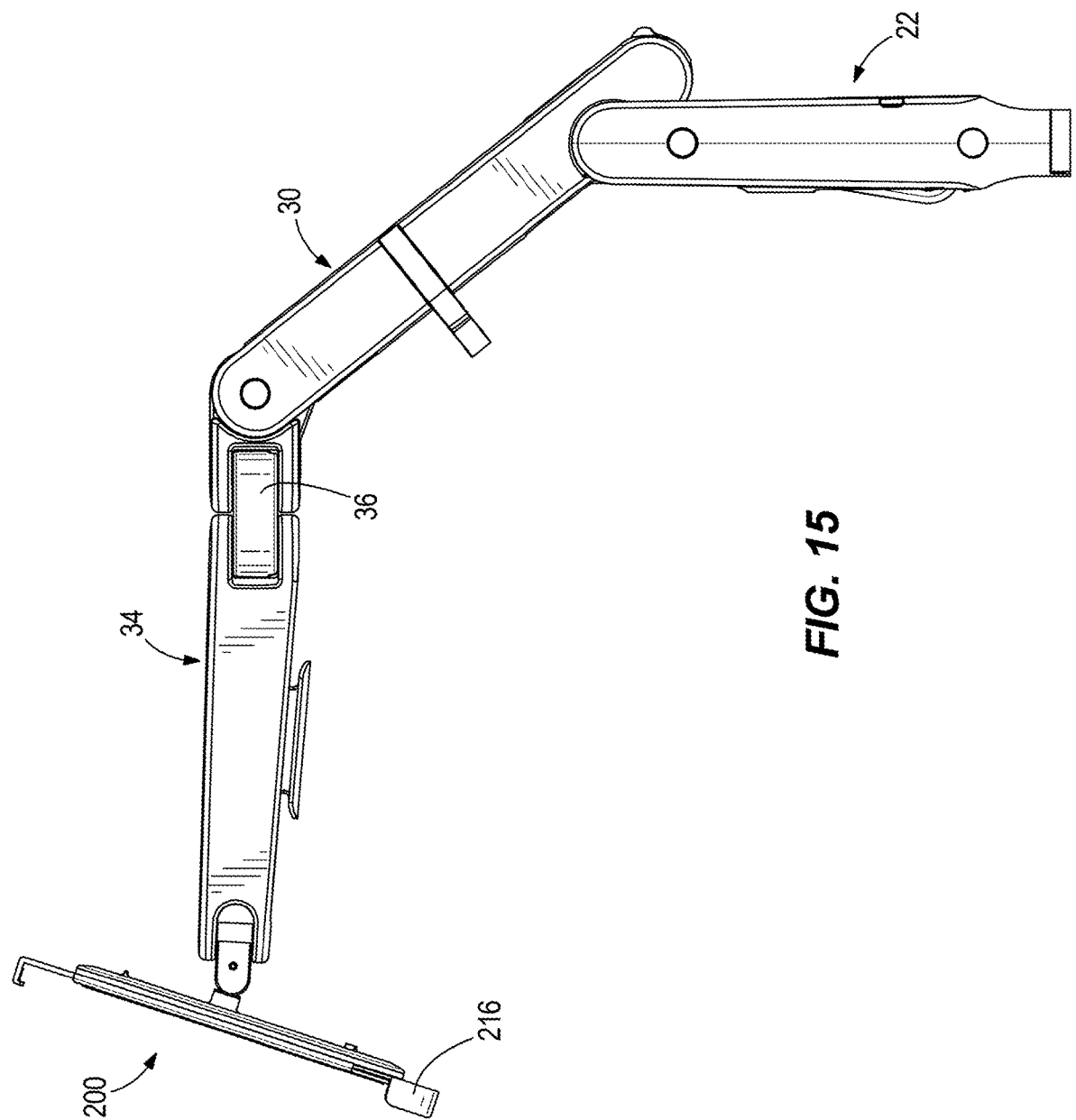
FIG. 15 is a side view of FIG. 14.
Figure 18:
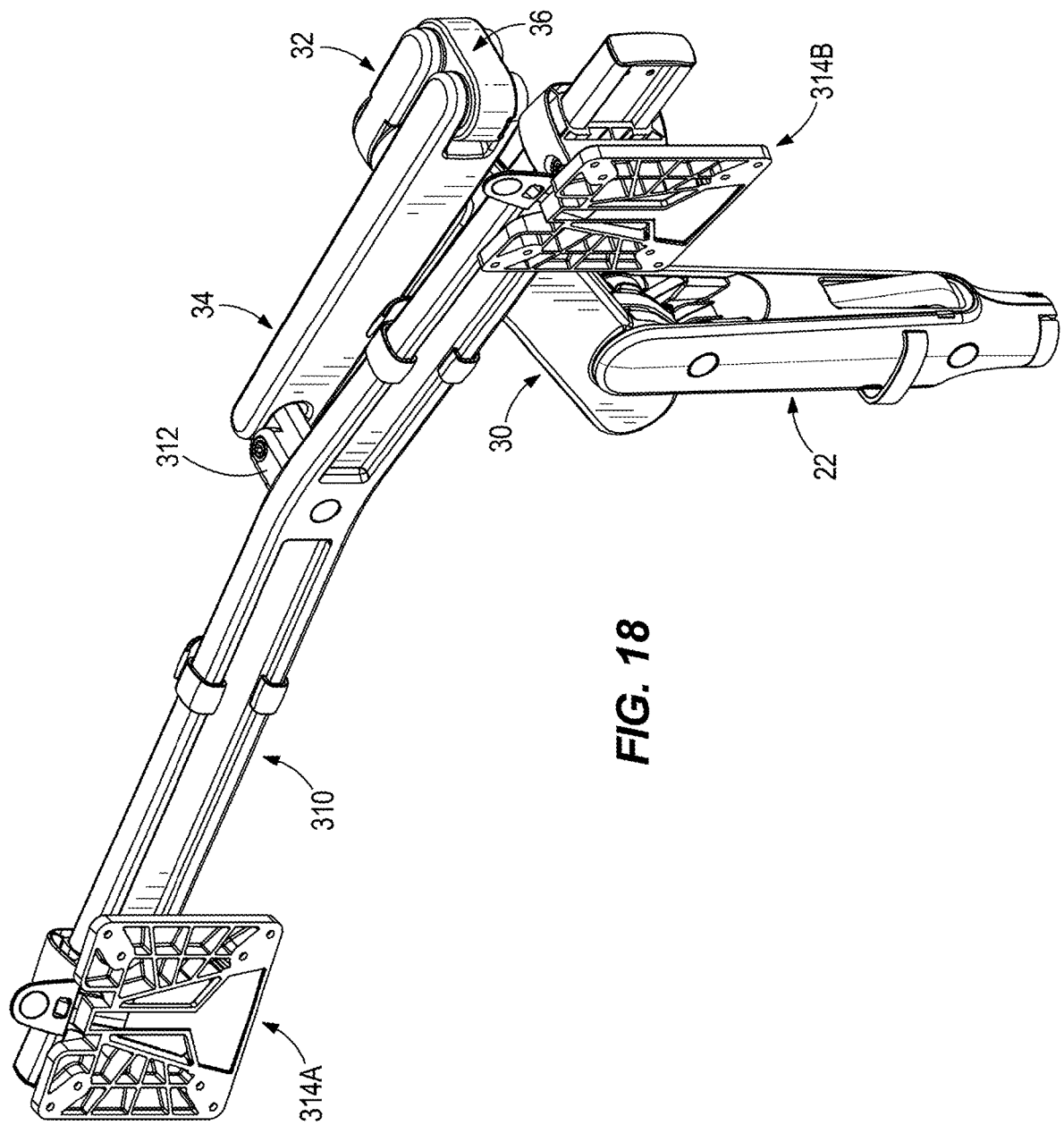
FIG. 18 is a front perspective view of the dual mount connected to the support system arms.
Figure 19:
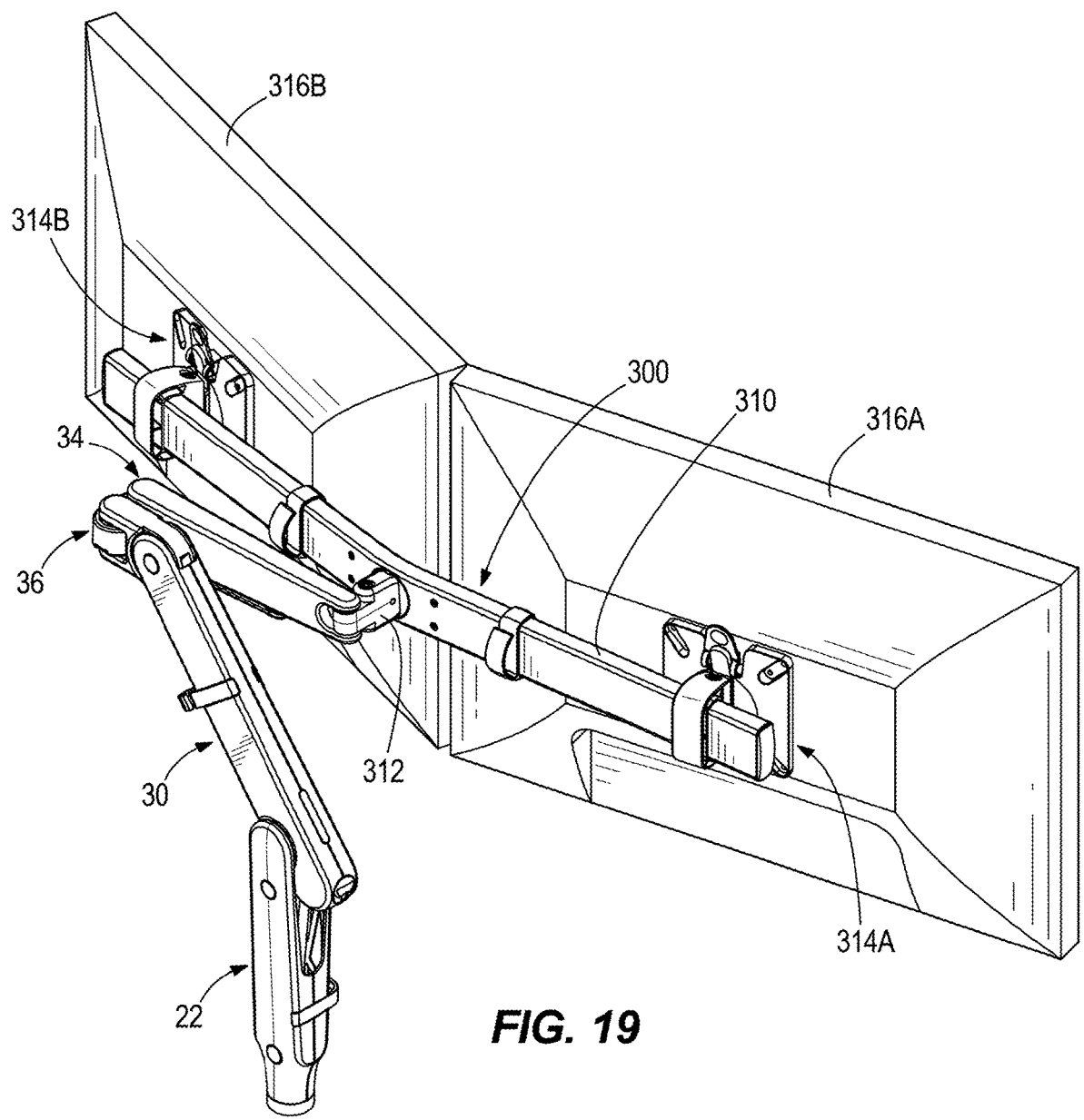
FIG. 19 is a rear perspective view of FIG. 18 with displays connected to the dual mount.

Different accessory components can be connected to the third arm 34 in place of the mounting head 38. FIGS. 13-15 show a tablet mount 200 having an adjustable mounting portion 210 that is connected to the third arm 34. The mounting portion 210 can include a ball joint 212 and a set screw 214. One or more extendable arms 216 are provided to receive different sized tablets. FIGS. 16-18 show a dual support 300 having a bar 310 with a rotatable mounting portion 310 that is connected to the third arm 34. First and second mounting plates 314A, 314B are slidably connected to the bar 310 to support two displays 316A, 316B as best shown in FIG. 19. Providing accessories that mount directly to the third arm 34, as opposed to the mounting head 38 or VESA plate 40 helps reduce the weight and space requirements of the support system 20.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A support system for a display device comprising:
   a first arm having a lower connection member;
   a second arm rotatably connected to the first arm about a first axis;
   a joint rotatably connected to the second arm about a second axis; and
   a biasing system including a biasing member having a first end positioned in the first arm and a second end positioned in the second arm, the biasing member providing a force to balance a load applied to the second arm, and wherein the biasing member includes an elastomeric spring that has undergone a pre-stretch treatment, and wherein the pre-stretch treatment stretches the biasing member to a stretch length that is greater than a final length and then relaxed,
   wherein the elastomeric spring includes a first end portion, a second end portion, a first portion having a first cross-section relative to a longitudinal axis of the elastomeric spring and a second portion having a second cross-section relative to a longitudinal axis of the elastomeric spring, wherein the shape of the second cross-section is different than the shape of the first cross-section and the area of the first cross-section is the same as the area of the second cross-section.

2. The support system of claim 1, wherein the elastomeric spring includes a thermoplastic material.

3. The support system of claim 1, wherein the biasing system includes a first pulley positioned in the first arm, a second pulley positioned in the second arm, and a bracket having a first portion positioned in the first arm and a second portion positioned in the second arm.

4. The support system of claim 3, wherein the first end of the biasing member is connected to the bracket.

5. The support system of claim 4, wherein the biasing member engages the first pulley and the second pulley, and connects to the bracket at a position between the first pulley and the second pulley.

6. The support system of claim 1, further comprising an adjustment mechanism connected to the biasing system.

7. The support system of claim 6, wherein the adjustment mechanism includes a moveable fulcrum for adjusting the force provided by the biasing member, and wherein the fulcrum engages the biasing member between the first end and the second end.

8. The support system of claim 7, wherein the adjustment mechanism includes an adjustment body connected to the fulcrum and a rotatable movement mechanism, wherein the adjustment body includes a first member, a second member connected to the first member, and a third member connected to the second member, and wherein the adjustment mechanism includes an adjustment pin, the first member includes a first set of openings receiving the adjustment pin, the second member includes a second set of openings receiving the adjustment pin, and the movement mechanism is threadably connected to the adjustment pin.

9. The support system of claim 1, wherein the pre-stretch treatment includes stretching the biasing member a plurality of times.

10. A support system for a display device comprising:
    a support structure including a first arm and a second arm rotatably connected to the first arm about a first axis;
    a biasing system including a biasing member extending between the first arm and the second arm, the biasing member having a first end and a second end and providing a force to balance a load applied to the support structure; and
    an adjustment mechanism connected to the biasing system and including a moveable fulcrum for adjusting the force provided by the biasing member, wherein the fulcrum engages the biasing member between the first end and the second end,
    wherein the biasing member includes an elastomeric spring that has undergone a pre-stretch treatment,
    wherein the adjustment mechanism includes an adjustment body connected to the fulcrum and a rotatable movement mechanism,
    wherein the adjustment body includes a first member, a second member connected to the first member, and a third member connected to the second member, and
    wherein the adjustment mechanism includes an adjustment pin, the first member includes a first set of openings receiving the adjustment pin, the second member includes a second set of openings receiving the adjustment pin, and the movement mechanism is threadably connected to the adjustment pin.

11. The supports system of claim 10, wherein the fulcrum is moveable away from the first axis to increase the force provided by the biasing member.

12. The support system of claim 10, wherein the support structure further comprises a joint rotatably connected to the second arm about a second axis, and wherein a third axis extends through the second arm between the first axis and the second axis, and the fulcrum moves along a fourth axis that intersects the third axis at an oblique angle.

13. The support system of claim 10, wherein the adjustment body includes a moveable indicator.

14. The support system of claim 10, wherein the movement mechanism includes a thumbwheel and a socket.

15. The support system of claim 14, wherein a cover is connected to the support structure that prevents access to the thumbwheel while allowing access to the socket.

16. The support system of claim 10, wherein the fulcrum includes a rotatable pulley engaging the biasing member.

17. A support system for a display device comprising:
    a first arm having a lower connection member;
    a second arm rotatably connected to the first arm about a first axis;
    a joint rotatably connected to the second arm about a second axis; and
    a biasing system including a biasing member having a first end positioned in the first arm and a second end positioned in the second arm, the biasing member providing a force to balance a load applied to the second arm, and wherein the biasing member includes an elastomeric spring that has undergone a pre-stretch treatment, and wherein the pre-stretch treatment orients the molecules of the biasing member,
    wherein the elastomeric spring includes a first end portion, a second end portion, a first portion having a first cross-section relative to a longitudinal axis of the elastomeric spring and a second portion having a second cross-section relative to a longitudinal axis of the elastomeric spring, wherein the shape of the second cross-section is different than the shape of the first cross-section and the area of the first cross-section is the same as the area of the second cross-section.

18. The support system of claim 17, wherein the biasing system includes a first pulley positioned in the first arm, a second pulley positioned in the second arm, and a bracket having a first portion positioned in the first arm and a second portion positioned in the second arm.

19. The support system of claim 17, further comprising an adjustment mechanism connected to the biasing system and including a moveable fulcrum for adjusting the force provided by the biasing member, wherein the fulcrum engages the biasing member between the first end and the second end.

20. The support system of claim 19, wherein the adjustment mechanism includes an adjustment body connected to the fulcrum and a rotatable movement mechanism, wherein the adjustment body includes a first member, a second member connected to the first member, and a third member connected to the second member, and wherein the adjustment mechanism includes an adjustment pin, the first member includes a first set of openings receiving the adjustment pin, the second member includes a second set of openings receiving the adjustment pin, and the movement mechanism is threadably connected to the adjustment pin.

\* \* \* \* \*